US006959576B2

(12) United States Patent
Hastings et al.

(10) Patent No.: US 6,959,576 B2
(45) Date of Patent: Nov. 1, 2005

(54) COLD FORMING OF SPLINED TRANSMISSION HUBS

(75) Inventors: Richard James Hastings, Warwickshire (GB); Luigi Ricci, Woodbridge (CA); Giso Czychoratzki, Oshawa (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 10/398,418

(22) PCT Filed: Oct. 5, 2001

(86) PCT No.: PCT/CA01/01392

§ 371 (c)(1),
(2), (4) Date: Sep. 9, 2003

(87) PCT Pub. No.: WO02/28561

PCT Pub. Date: Apr. 11, 2002

(65) Prior Publication Data

US 2004/0031153 A1 Feb. 19, 2004

Related U.S. Application Data

(60) Provisional application No. 60/238,794, filed on Oct. 5, 2000.

(51) Int. Cl.[7] .............................................. B21B 27/00
(52) U.S. Cl. ............................ 72/91; 72/102; 72/112; 72/115
(58) Field of Search ............................ 72/91, 92, 102, 72/103, 112, 115, 117, 125

(56) References Cited

U.S. PATENT DOCUMENTS

| 4,462,235 | A | * | 7/1984 | King .......................... 72/103 |
| 5,203,223 | A | | 4/1993 | Himmeroeder |
| 5,297,411 | A | * | 3/1994 | Scrimshaw .................... 72/70 |
| 5,384,949 | A | | 1/1995 | Wodrich et al. |
| 5,404,640 | A | | 4/1995 | Himmeroeder |
| 5,622,071 | A | * | 4/1997 | Van Riper et al. ............ 72/117 |
| 6,516,647 | B1 | * | 2/2003 | Hirschvogel et al. .......... 72/67 |
| 6,694,791 | B1 | * | 2/2004 | Johnson et al. ................ 72/91 |

FOREIGN PATENT DOCUMENTS

DE          195 27 995 A1     7/1995

* cited by examiner

Primary Examiner—Ed Tolan
(74) Attorney, Agent, or Firm—Clark Hill PLC

(57) ABSTRACT

A method for cold forming splined transmission hubs is provided. A blank (10) with an inner surface and an outer surface is secured on a tool insert support member (100). The tool insert support member (100) has an internal spline tooth profile (110) machined into it. A forming roller (120) is inserted inside the blank and then moves radially under pressure until it contacts an inner surface of the blank. A set of teeth (111) are created on the outer surface of the blank (10) and the blank (10) is rotated relative to the forming roller (120) to form an oil reservoir on the inner surface of the blank.

8 Claims, 4 Drawing Sheets

COLD FORMING OF SPLINED TRANSMISSION HUBS

RELATED APPLICATION

This application is a 371 filing of PCT Application CA01/01392, filed Oct. 5, 2001, which claims priority to and all the benefits of U.S. Provisional Patent Application No. 60/238,794, filed on Oct. 5, 2000.

FIELD OF THE INVENTION

The invention relates to hubs for automotive transmissions. More particularly, this invention relates to a one-step production method for cold forming a hub of an automotive transmission.

DESCRIPTION OF THE RELATED ART

Flow forming of transmission components, such as clutch housings, is a common manufacturing process. Typically, a tubular shell is provided from a stamped disc, and internal drive spline teeth are roll formed while maintaining a smooth and constant outer diameter. In axial roll forming, a cup-shaped blank is mounted on a shaped mandrel, and a roll formed tool moves axially to press the metal to the tooth shape on the mandrel, essentially one tooth at a time. The mandrel is rotated to present the unworked surface to the roll form to allow the entire inner surface to be splined. U.S. Pat. No. 5,515,955 discloses such a cold forming process to generate spline teeth in a torque converter. And U.S. Pat. No. 5,384,949 discloses a multi-step cold forming process for forming a clutch housing with an internal radial spline, a torque transmitting tube portion and an axially extending drive portion.

Cold forming a series of teeth in the thickened outer rim portion of a starter ring gear is disclosed in U.S. Pat. Nos. 5,152,061, 5,203,223, 5,237,744 and 5,404,640. In U.S. Pat. No. 5,404,640 there is an indication that where the teeth are totally cold formed, tight tolerances are difficult to achieve and an additional cutting step is required after the cold forming step is completed. This additional step adds cost and cycle time to the manufacturing process.

The existing methods are limited to housings with internal splines, or housings with external splines that must be subsequently machined or broached to achieve acceptable tolerances. An oil reservoir or dam, typically present to supply lubricant between the spline teeth and contacting clutch plates, is typically machined into housings in a separate and subsequent metal removal step.

SUMMARY OF THE INVENTION

The invention describes a method for cold forming a transmission hub from a blank having an outer surface and an inner surface using a tool insert support member having a spline tooth portion and a reservoir portion including a forming roller. The method includes the steps of positioning the blank axially with the spline tooth portion of the tool insert support member, engaging the spline tooth portion with the outer surface of the blank, exerting a radial pressure on the blank forcing the blank into engagement with the spline tooth portion, creating a set of teeth on the outer surface of the blank; and rotating the blank relative to the forming roller to form an oil reservoir on the inner surface of the blank.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
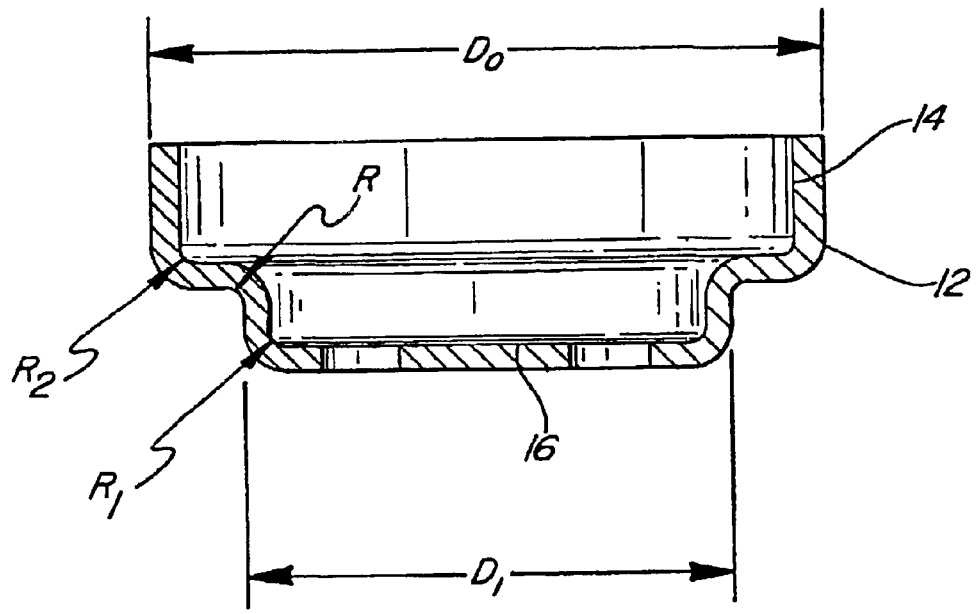
FIG. 1 is a cross-sectional view of a steel cylindrical blank.

As shown in FIG. 1, a cup-shaped blank 10 is provided having an internal step, defined in part by gentle radii R, $R_1$ and $R_2$. The blank 10 has two diameters defined by an outer diameter $D_o$ and an inner diameter $D_i$. The blank 10 includes an outer surface 12 and an inner surface 14. A bottom surface of blank 10 is indicated at 16.

Figure 2:
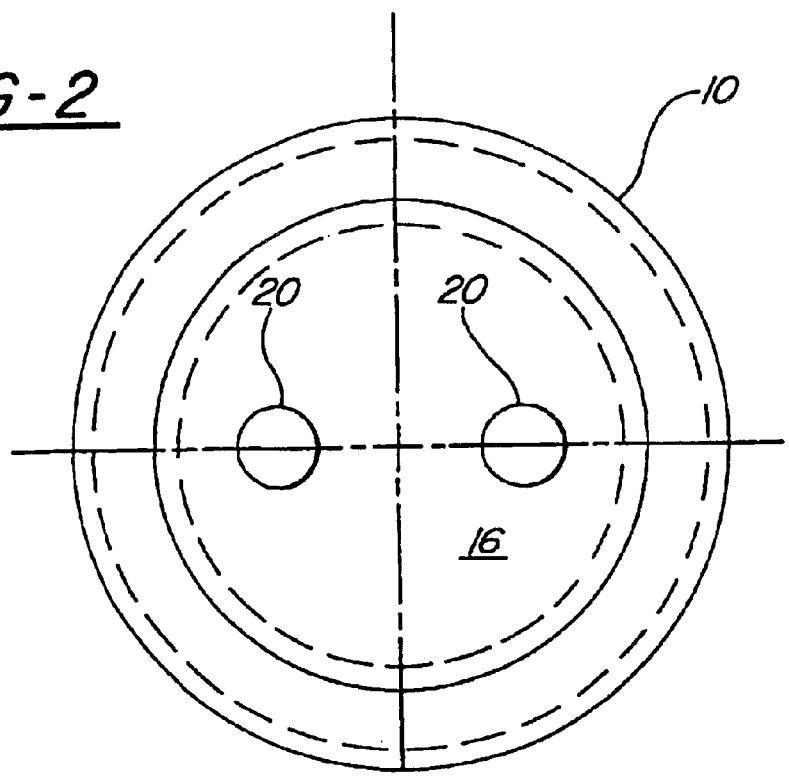
FIG. 2 is a top view of the steel cylindrical blank.

The blank 10 is a circular disk that is mounted onto a mandrel or die and is drawn into the shape by well-known techniques. As shown in FIG. 2, a pair of circular holes 20 are drilled or otherwise punched out of a bottom surface 16 of the blank 10, the purpose of which will be explained later. The blank 10 is preferably formed from steel, which is capable of being cold formed.

Figure 3:
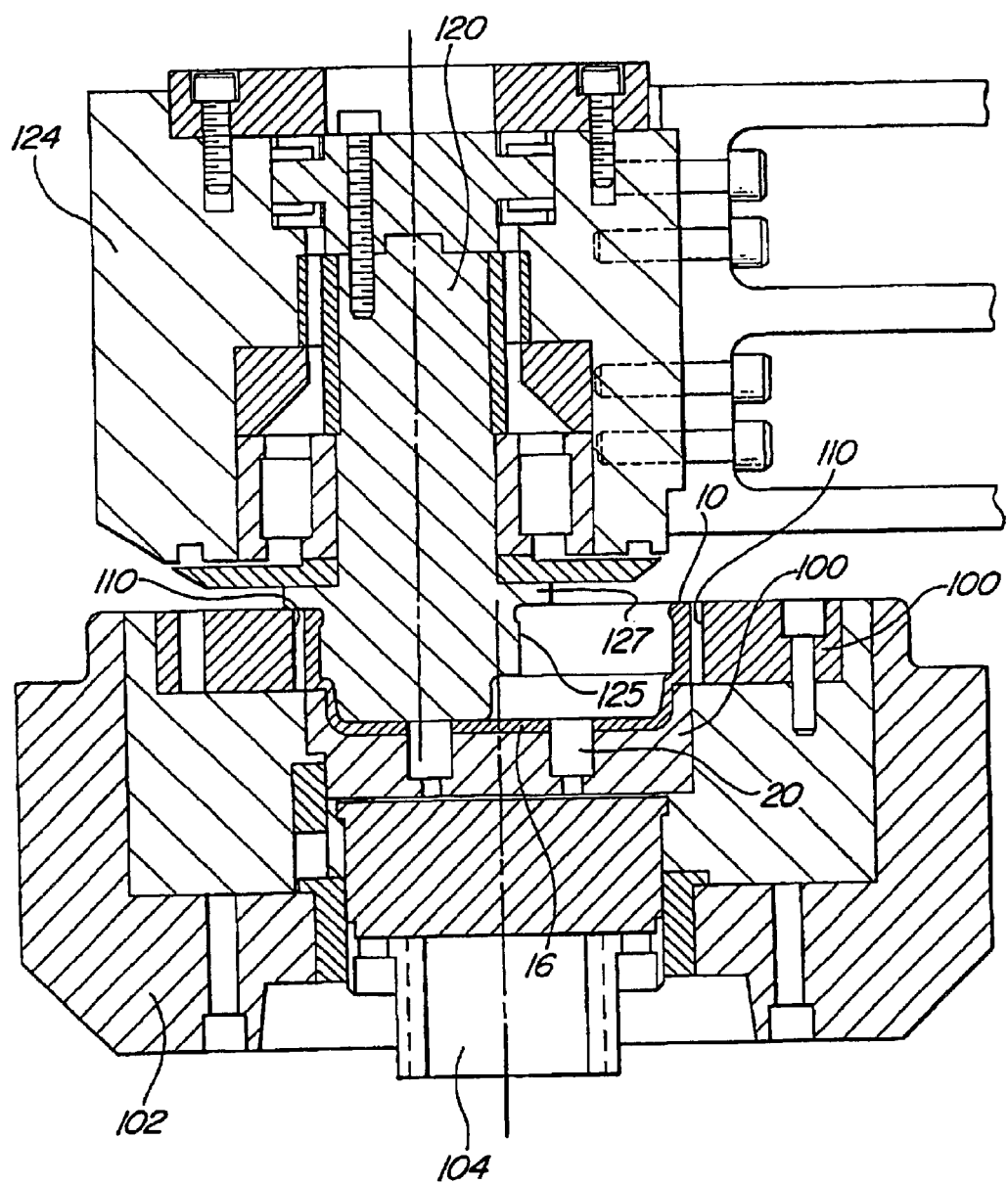
FIG. 3 is a cross-sectional view of the forming tool setup.
Figure 4:
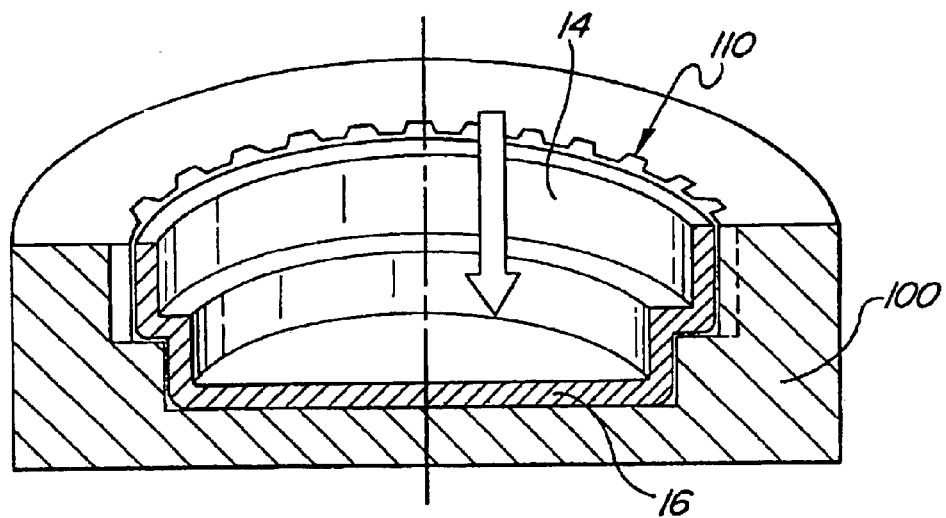
FIG. 4 is a perspective, cross-sectional view of a blank illustrating its insertion into a supporting tool insert having a predetermined tooth profile.
Figure 5:
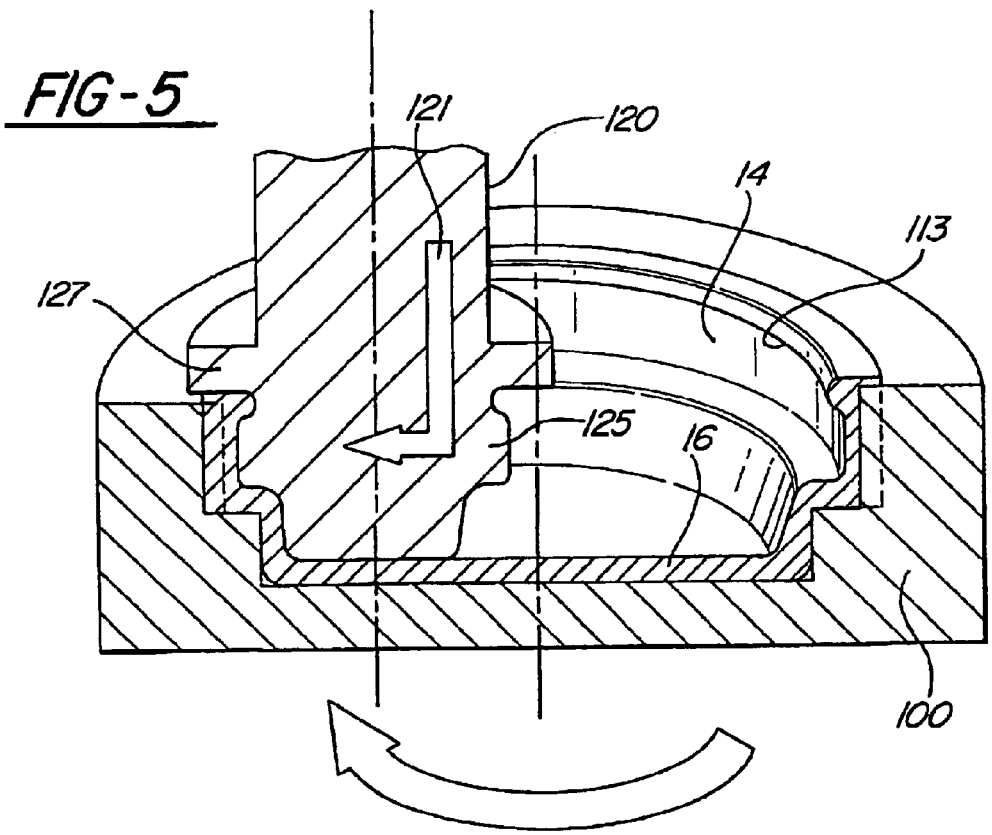
FIG. 5 is a perspective, cross-sectional view according to the invention whereby a forming roller travels vertically and horizontally against the inside of the blank to cold form the material.

In the forming procedure, the blank 10 is positioned in a tool insert support member 100, as shown in FIGS. 3, 4, and 5. The tool insert support member 100 is inserted into an opening (not shown) of a lower tool member 102. The opening of the lower tool member 102 may be adjusted to receive tool insert support members 100 of different sizes. Similarly, a shaft 104 raises and lowers the lower tool member 102 to accommodate different sized tool insert support members 100. As a result, the same lower tool member 102 may be used for cold forming blanks 10 of various shapes. The blank 10 is secured to the tool insert support member 100 by pins (not shown) that are inserted into the lower tool member 102 through the circular holes 20.

The tool insert support member 100 has a spline tooth profile 110 permanently machined into its interior. A preformed blank is created by moving a forming roller 120 into the interior volume of the blank 10 and abutting same on the interior surface 14. The forming roller 120 is a component of an upper tool member 124, and is mounted in an opening (not shown) therein. As with the lower tool member 102, the opening of the upper tool member 124 is sized to accommodate rollers of various sizes. Preferably, the upper tool member 124 and the lower tool member 102 are two pieces. However, a one-piece tooling member may also be used.

The outer diameter of the forming roller 120 is typically 40–60% of the outer diameter of the blank 10. However, smaller roller diameters can be used to maximize the amount of cold forming per revolution.

The forming roller 120 first moves in a vertically downward direction, until it is positioned just above the bottom surface 16 of the blank 10. The forming roller 120 does not make contact with the bottom surface 16 because surface removal of material undesirable.

Next, the forming roller 120 moves under radial pressure to force the steel material on the outer surface 12 of the blank 10 into a spline tooth profile 110 of the tool insert support member 100. The contoured shape of the forming roller 120 includes a protrusion 125 and recess 126. The protrusion 125 is pressed against the inner surface 14 of the blank 10 to cold form an oil dam or inner oil reservoir 112 on the inner surface 14 of the blank while the spline teeth 111 are formed on the outer surface 12 of the blank 10. The recess 126 allows material to flow past the protrusion 125 to limit the width of the oil reservoir 112 by creating a wall 113. An edge lip 127 is also provided on the forming roller 120. The edge lip 127 forms a strengthening shoulder region 140 on the blank 10.

During the forming operation, the tool insert 100 is rotated by an electric motor drive or other suitable device. Rotational speeds are normally above 600 rpm, although slower speeds can also be used. The forming roller 120 is free running upon contacting the blank 10 as pressure is applied. In an alternative embodiment, the forming roller 120 may also rotate. Regardless, once the forming roller 120 contacts the rotating blank when a force 121 is applied thereto laterally, the forming roller 120 forces the blank 10 into shape.

Figure 6:
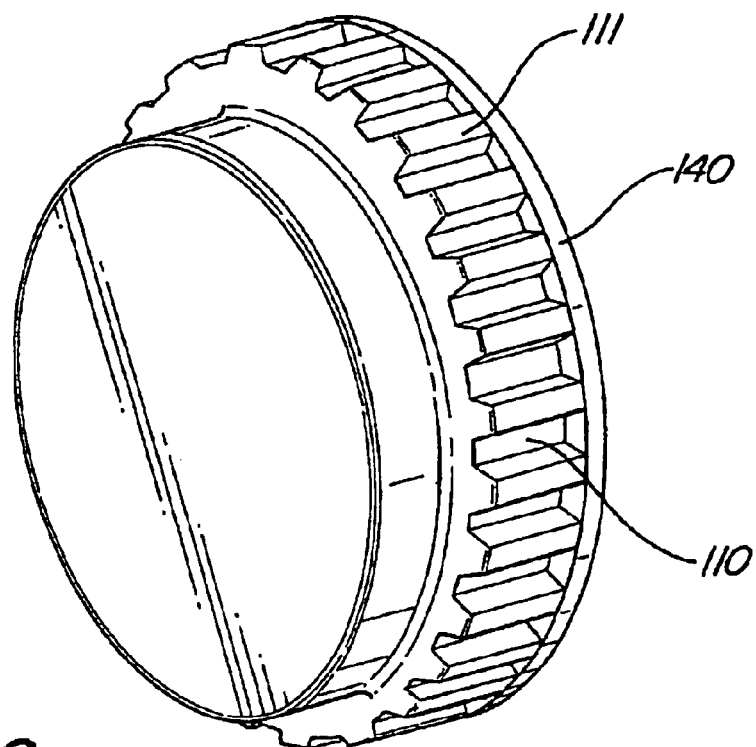
FIG. 6 is a perspective view of the hub manufactured according to the invention.
Figure 7:
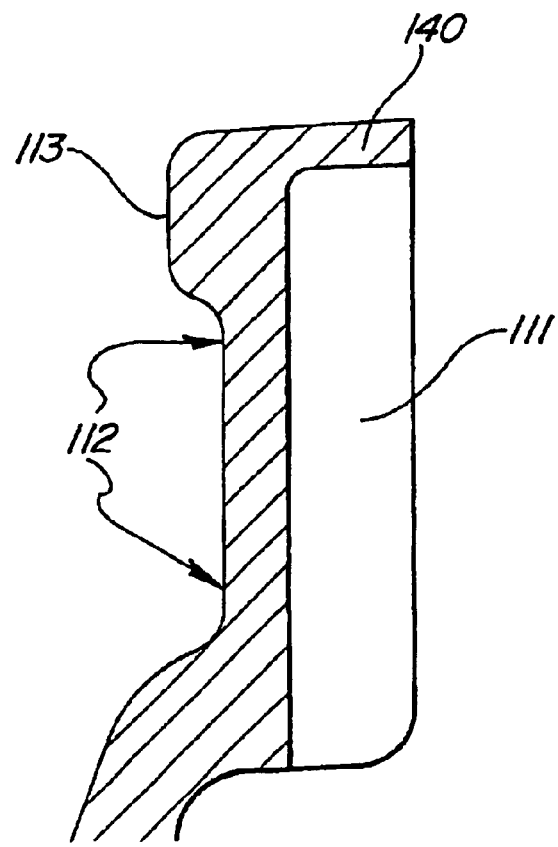
FIG. 7 is a cross-sectional side view, partially cut away, of the hub of FIG. 6.

As shown in FIGS. 6 and 7, the spline teeth 111 are formed on the outer surface 12 of the blank 10 and the oil reservoir 112 is cold formed on the inner surface 14 of the blank 10. Because the oil reservoir 112 and the spline teeth 111 are created at the same time, no further machining steps are required. In addition, a strengthening shoulder 140 that interconnects the spline teeth 111 is formed along the outer periphery of the blank 10.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for cold forming a transmission hub from a cup-shaped blank having an outer surface and an inner surface, said inner surface including a bottom surface, the method comprising the steps of:

positioning the blank axially within of a tool insert support member having a spline tooth portion;

inserting a forming roller into said cup-shaped blank, without the forming roller contacting the bottom surface;

rotating the blank;

exerting a radial pressure on the blank by moving the forming roller relative to the rotating blank forcing the blank into engagement with the spline tooth portion thereby forming a set of teeth on the outer surface of the blank; and forming an oil reservoir in the inner surface of the blank.

2. A method as claimed in claim 1 wherein said exerting step and said forming step occur simultaneously.

3. A method as claimed in claim 2 wherein said exerting step and said forming step includes rotating said forming roller relative to said blank.

4. A method as set forth in claim 3 wherein said forming roller has an outer diameter and said blank has an outer diameter, said outer diameter of the forming roller is 40–60% of the outer diameter of the blank.

5. A method as set forth in claim 3 wherein said method includes a step of forming a wall defining a portion of said reservoir.

6. A method as set forth in claim 5 including a step of forming a strengthening lip around a periphery of the blank interconnecting said set of teeth.

7. A method as set forth in claim 5 wherein said wall and strengthening lip are formed simultaneously with said set of teeth and said reservoir.

8. A method as set forth in claim 7 wherein said tool insert support member is rotated in excess of 600 RPM.

* * * * *